Figure 1:
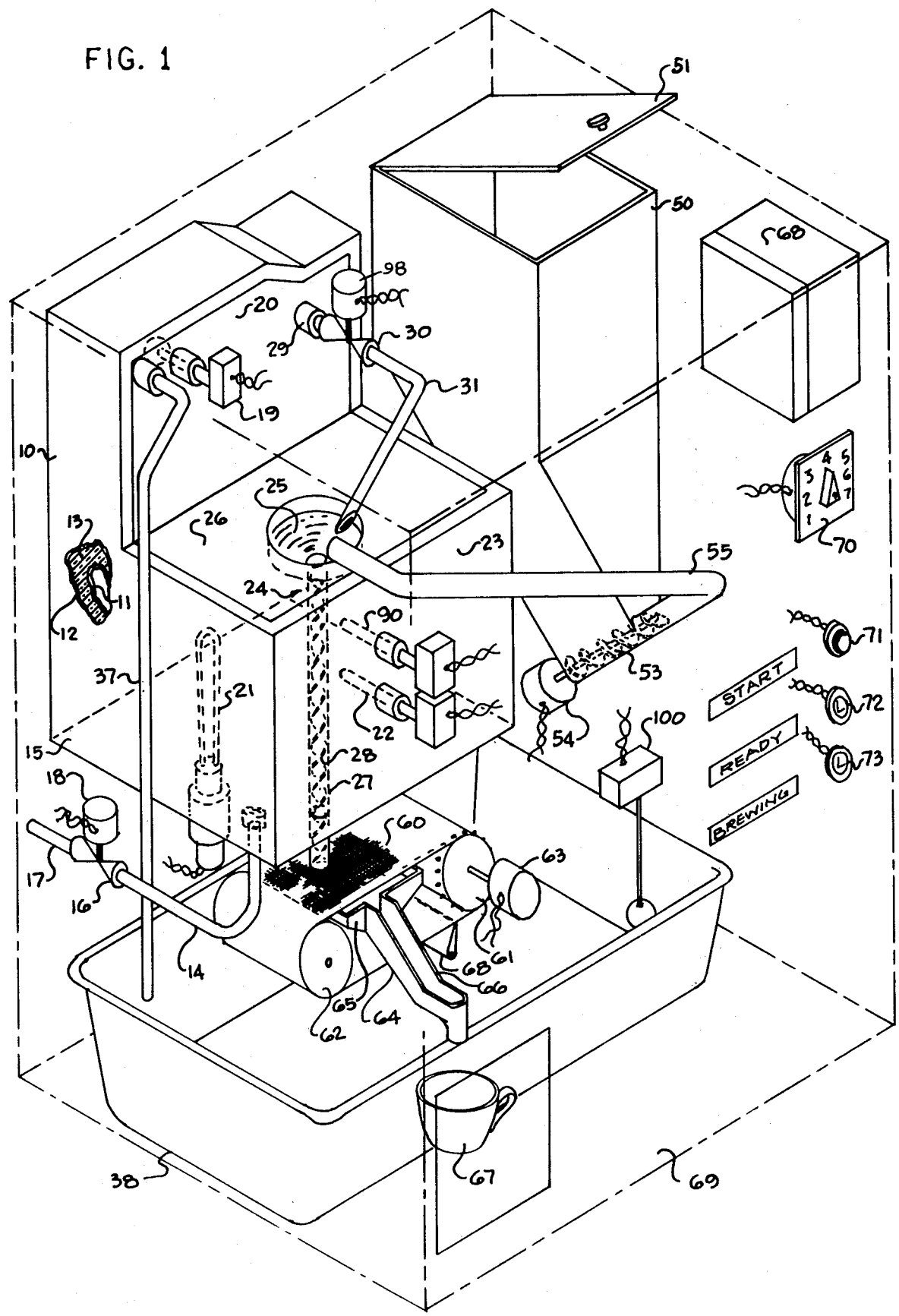

United States Patent [19]

Merman

[11] 4,134,332
[45] Jan. 16, 1979

[54] CONTINUOUS BEVERAGE BREWER

[76] Inventor: Richard J. Merman, 5472 Vicaris St., Philadelphia, Pa. 19128

[21] Appl. No.: 861,273

[22] Filed: Dec. 16, 1977

Related U.S. Application Data

[63] Continuation-in-part of Ser. No. 764,326, Jan. 31, 1977, abandoned.

[51] Int. Cl.$^2$ .......................... A47J 31/00; A47J 31/06
[52] U.S. Cl. ..................................... 99/289 T; 99/307; 210/400
[58] Field of Search ...................... 99/283, 289 R, 299, 99/300, 304, 305, 307, 289 T, 298; 210/400; 366/150, 165, 336

[56] References Cited

U.S. PATENT DOCUMENTS

| | | | |
|---|---|---|---|
| 2,517,073 | 8/1950 | Alvarez | 99/289 |
| 2,601,018 | 6/1952 | Heyl et al. | 366/339 |
| 3,084,613 | 4/1963 | Maxson | 99/289 R |
| 3,306,183 | 2/1967 | Richeson | 210/400 X |
| 3,426,670 | 2/1969 | Wittern | 99/298 |
| 3,739,709 | 6/1973 | Herbsthofer et al. | 99/289 R |

Primary Examiner—Robert W. Jenkins
Attorney, Agent, or Firm—Martin L. Faigus

[57] ABSTRACT

A continuous automatic beverage brewer is provided for producing a brewed liquid beverage, such as coffee, in any desired pre-selectable amount. The brewer includes means for supplying a liquid, such as heated water, and a solid particulate beverage ingredient, such as ground coffee, to a mixing duct through which the mixture passes for a time sufficient to effect proper brewing. A moving filter intercepts the mixing duct so that a fresh surface of the filter is continually presented to the mixture of brewed beverage and spent solid residue of the beverage ingredient to thereby achieve effective filtering. Preferably the moving filter comprises a continuous belt of filter material, the surface of which moves continually past the output of the mixing duct so as to continually remove the spent solid residue. When continuously brewing a hot liquid beverage (e.g. coffee) means are provided for maintaining the mixture of the liquid and the beverage ingredient at the desired brewing temperature during passage of the mixture through the mixing duct, preferably by disposing the mixing duct within a reservoir containing the heated liquid therein. Selectively controllable timing means are provided for controlling the supply of heated liquid and solid beverage ingredient to the mixing duct during pre-selectable intervals to produce any desired quantity of brewed beverage, and also for controlling the operation of the filter belt to cause its surface to move past the outlet of the mixing duct when the brewed beverage is being supplied therefrom.

11 Claims, 2 Drawing Figures

CONTINUOUS BEVERAGE BREWER

This application is a continuation-in-part of pending U.S. application Ser. No. 764,326, filed on Jan. 31, 1977, and entitled CONTINUOUS COFFEE BREWER, now abandoned.

This invention relates to an improved beverge brewer particularly adapted for continuously brewing a beverage of high quality in any desired quantities. The brewer is of the type employing a solid beverage ingredient, preferably in particulate form, from which a liquid extracts desired component to form the liquid beverage, while leaving a spent residue requiring subsequent disposal. The invention is particularly directed to a continuous hot beverage brewer, such as a continuous coffee brewer that is adapted for use in offices and restaurants and also for automatic operation in vending machines, as well as for home use.

Prior coffee brewers for use in producing large quantities of freshly brewed ground coffee generally have relied for their operation on the batch principle wherein each brewing cycle is carried out by causing a given quantity of heated water, after being mixed or seeped gradually through the ground coffee, to pass through a stationary filter element. The quality of coffee prepared in this manner can vary widely from brewing cycle to brewing cycle, at least in part due to the fact that the filter tends to clog to different degrees in different cycles, thereby causing uncontrolled variations in residence time of the liquid and ground coffee in the different brewing cycles. This results in uncontrolled brewing conditions, often leading to the production of inferior quality coffee. Representative batch-type coffee brewers are disclosed in U.S. Pat. Nos. 3,306,183, issued to Richeson; and 3,426,670, issued to Wittern.

Hot beverage brewers employing soluble beverage ingredients, such as instant and freeze-dried coffee particles, are also known in the prior art, as exemplified in U.S. Pat. Nos. 3,084,613, issued to Maxson; and 3,739,709, issued to Herbsthofer. Although this type of brewing apparatus has been used commercially to make coffee, most coffee drinkers prefer a quality brew that can only be achieved with fresh coffee grounds of the type that leaves a spent residue after the brewing operation.

Accordingly it is a principal object of the present invention to provide a continuous beverage brewing apparatus in which a liquid at a desired temperature is combined with a solid beverage ingredient, preferably in particulate form, and thereafter permitted to brew for a suitable period of time, after which the resultant mixture, including spent residue from the beverage ingredient, is directed onto a moving filter to continuously remove the spent solid residue while continuously disposing a new filter area to successive portions of the brewed beverage so as to provide for more effective filtering action without requiring that all of the brewed beverage pass through the same filter sections.

It is a further object of this invention to provide a brewer of the above type for brewing a hot liquid beverage, such as hot ground coffee.

It is a further object of this invention to provide an improved hot beverage brewing apparatus, such as a coffee brewing apparatus, in which the mixture of a liquid and a solid beverage ingredient is maintained at a desired temperature during the brewing process.

It is a further object of this invention to provide a continuous beverage brewer which is automatically controllable to produce any desired quantity of a liquid beverage.

It is a further object of this invention to provide an automatic beverage brewing apparatus which is particularly adapted for use in automatic vending machines.

In accordance with the invention, the foregoing objects are achieved by providing a continuous beverage brewing apparatus which comprises: a mixing duct for mixing a liquid and a solid beverage ingredient, preferably in particulate form, said duct including an inlet adjacent one end for receiving the liquid and beverage ingredient to mix them together, an outlet adjacent the opposite end for delivering the brewed beverage and spent solid residue and an elongate brewing zone between the inlet and the outlet through which the mixture moves as it is being brewed; means for delivering the liquid and the beverage ingredient to the inlet of the mixing duct; a movable filter intercepting the flow of the brewed beverage and spent beverage ingredient as they exit from the outlet of the mixing duct for collecting the spent beverage ingredient and passing the brewed beverage; filter mounting means for permitting movement of the filter with respect to the outlet of the mixing duct at the same time that the brewed beverage and spent beverage ingredient are being delivered through the outlet; drive means for moving the filter relative to the outlet of the mixing duct; control means for actuating the drive means at the same time that the brewed beverage and spent beverage ingredient are being delivered through the outlet of the mixing duct to thereby move the filter with respect to the outlet to remove the spent beverage ingredient and to present a fresh filter surface for receiving the brewed beverage; and means for receiving and dispensing brewed and filtered beverage after passage through the filter.

In the preferred embodiment of the invention the continuous beverage brewing apparatus includes a liquid reservoir for storing the liquid and a beverage ingredient reservoir for storing the beverage ingredient, and the means for delivering the liquid and the beverage ingredient to the inlet of the mixing duct communicate with said reservoirs. For making a heated beverage, such as coffee, a heating means is provided to heat the liquid prior to directing the liquid to the mixing duct; and most preferably the mixture is maintained at an optimum temperature for brewing as it passes through the mixing duct. When a liquid reservoir is employed to contain the heated liquid the optimum temperature during the brewing operation can be maintained by positioning the mixing duct directly within the water reservoir. Further, in a preferred form of the invention, the movable filter may comprise a continuous belt of filter material which is continually moved by rollers so as to dispose of the spent beverage ingredients and continually to present a clean filter portion to the liquid beverage to be filtered.

Figure 2:
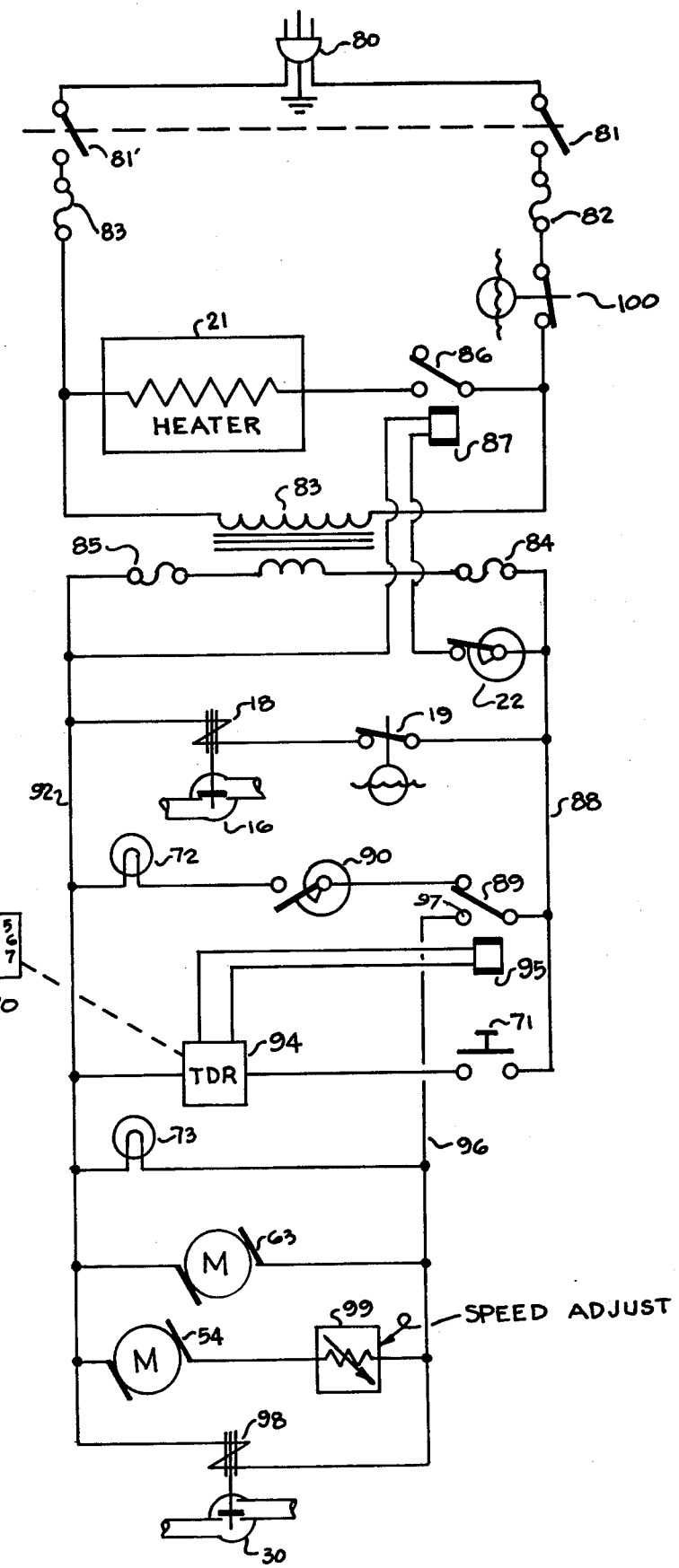

Other objects and a fuller understanding of the invention will be had by referring to the following detailed description, taken in conjunction with the accompanying drawings, wherein like reference characters refer to similar parts through the several views, and in which:

FIG. 1 is a perspective view of a beverage brewer, specifically designed for hot coffee brewing, in accordance with the invention, and FIG. 2 is a schematic diagram showing electrical circuits for use in operating the coffee brewer of FIG. 1.

Although specific terms are used in the following description for the sake of clarity, these terms are intended to refer only to the particular structure of the invention selected for illustrating the preferred embodiment, and are not intended to define or limit the scope of the invention. This invention will be described in connection with a continuous coffee brewing apparatus in which the solid beverage ingredient is ground coffee.

Referring to FIG. 1, the coffee brewer there illustrated comprises a water storage and heating tank 10 having an L-shaped configuration as shown. Preferably this tank may be of double-walled, insulated construction consisting of an internal liner 11 of stainless steel, and an outer wall portion 12 of suitable plastic material, the space between inner liner 11 and outer wall 12, which may be of the order to one-half inch in thickness, being filled with insulating material 13 such as fiberglass. A water inlet line 14 is connected through the bottom wall 15 of tank 10 for introducing water into tank 10 under control of a solenoid valve 16 interposed between a water supply line 17 and inlet line 14. The electrical connections to solenoid 18 of valve 16 and the manner of controlling it will be discussed further hereinafter. Solenoid valve 16 is actuated under control of a level switch 19 installed through wall 20 of tank 10 near the top of tank 10 as will be discussed further hereinafter. Level switch 19 operates to sense the level of water in tank 10 and controls the supply of power to solenoid 18 of inlet valve 16 so as to maintain the water in tank 10 at a level near the top thereof. An electrical heating element 21 also is installed through the lower wall 15 of tank 10 and the supply of electrical energy thereto is controlled by a thermostat 22 installed through wall 23 of tank 10 to sense the temperature of water within tank 10 and control the supply of energy to heating element 21 so as to maintain the water within tank 10 at an optimum temperature (e.g. 195° F.) for brewing coffee. A second thermostat 90, similarly installed through wall 23 of tank 10, also senses the temperature of water in tank 10 and actuates an indicator light 72 to indicate when water in tank 10 has reached the temperature suitable for brewing coffee. The electrical connection to heating element 21, thermostats 22 and 90 and indicator light 72 will be discussed further hereinafter.

Positioned vertically within tank 10 is a mixing duct 24 comprising a funnel portion 25, positioned in a hole in the upper horizontal wall 26 of tank 10, and a vertical tubular portion 27 extending down through tank 10 and through the lower wall 15 thereof. Both the funnel portion 25 and the tubular portion 27 of mixing duct 24 preferably may be fabricated of stainless steel welded into the tank liner 11, funnel portion 25 typically having a maximum diameter of four inches, its sides having a 45-degree angle of slope, and the tubular portion 27 being of the order of three-eighths inch diameter. If desired, tubular portion 27 may be provided with a auger-like insert 28 of stainless steel extending throughout its length to extend the time of passage of a mixture of water and ground coffee through said tubular portion to effect better brewing of coffee.

A connection 29 is provided through sidewall 20 of tank 10 through a solenoid valve 30 to the tube 31 having its lower end positioned to direct hot water supplied from the tank into the mouth of funnel portion 25 of mixing duct 24. Connection 29 is made at a point near the top of tank 10 but slightly below the position of level switch 19. Tube 31 may be of hard plastic and has its lower end bent to direct water tangentially into funnel portion 25 to produce agitation of the water injected thereby into funnel portion 25 and to exert a cleaning action thereon with respect to ground coffee also injected thereinto by means to be described presently. Solenoid valve 30 may be controlled as further described hereinafter to control the injection of measured quantities of hot water from tank 10 into the funnel portion 25 of mixing duct 24.

Preferably also there is provided an overflow connection from tank 10 to permit excess water to escape from the tank in the event of failure of water inlet valve 16. This connection may comprise a section of copper or plastic tubing 35 having one end connected through wall 20 of tank 10 at a point near the normal level of water in the tank as established under control of level switch 19, and extending downward so as to discharge overflow water into an overflow pan 38 disposed at the lower portion of the entire brewer assembly.

Also shown in FIG. 1 is a container 50 for storing a quantity of ground coffee. As shown, this container may conveniently be disposed alongside the water storage tank 10. It may be fabricated, for example, of any suitable plastic material, it is provided with a hinged lid 51 which may be opened to load ground coffee into it, and may have two of its sidewalls sloped to converge at a vertex near the lower extremity thereof to facilitate movement of ground coffee toward said vertex. Within container 50 near the vertex formed by its two sloping sides is arranged a helical impeller 53 connected to and adapted to be driven by a motor 54 for withdrawing ground coffee from container 50 and driving it through a conveyor tube 55. Impeller 53 preferably is made of stainless steel and tube 55 may be of hard plastic having one end connected to container 50 opposite one end of impeller 53 and having its other end positioned to direct ground coffee moving through it into the funnel portion 25 of mixing duct 24. As explained hereinafter, motor 54 may be actuated under control of a suitable timer to cause the movement of a desired quantity of ground coffee from container 50 through tube 55 into the funnel portion 25 of mixing duct 24.

Positioned immediately below tank 10, so as to intercept the flow of brewed coffee from the lower end of mixing duct 24, is a continuous belt 60 of suitable filter material supported by suitable filter mounting means, such as a pair of rollers 61 and 62. Preferably at least the driving roller 61 is provided with sprockets as shown for engaging cooperating holes in the edges of belt 60 for maintaining it in proper allignment and to provide for positive driving of belt 60 by roller 61 which is adapted to be driven by a motor 63 mechanically connected to it. Preferably, at least one of the rollers, e.g. roller 62, may be provided with a spring-loaded mounting (not shown) to maintain proper tautness in belt 60 for effective driving and tracking and to facilitate ready changing of belt 60. As will be explained further hereinafter, drive motor 63 may be actuated under control of a suitable timer so as to drive belt 60 only when liquid coffee is being discharged from the lower end of tube 27 of mixing duct 24.

Also in the arrangement of FIG. 1 there is provided a collector and delivery spout assembly 64, which may be fabricated of hard plastic or stainless steel, comprising a tray portion 65 positioned just beneath the upper portion of filter belt 60 and adapted to collect filtered liquid coffee passing through filter belt 60, and a spout portion 66 extending forwardly from tray portion 64 for delivering the liquid coffee collected by tray portion 65 to a point outside the boundary of overflow pan 38 for delivery to a cup 67 or other suitable receptacle. A scraper blade 68 may be suitably mounted so as to engage belt 60 after it has passed over roller 61 and for removing any remaining coffee grounds which may adhere thereto.

The filter belt 60 should be provided with openings that are small enough to prevent coffee grounds from passing through it. However, on the other hand, the belt should have a percentage open area that is high enough to permit rapid passage of the brewed coffee through it. This construction of the filter belt is very important, if not critical to the successful commercial operation of the preferred device of this invention. If the openings are too large the coffee grounds can pass into the brewed beverage, a condition that obviously is undesirable. If the percent open area is too small the brewed beverage may flood the belt, and thereby cause the apparatus to malfunction. Although the filters usable in this invention may be of the general type described in abandoned application Ser. No. 672,189, filed Mar. 31, 1976; the most preferred filter structures known to date are woven from 1 mil monofilament polyester or nylon threads, and are manufactured by Tetko, Inc., located on Saw Mill River Road in Elmsford, NY. Specific filter structures sold by Tetko that can be used in this invention are Brand Nos. HC 7-33 (polyester, 33 micron opening, 25% open area) and ASTM 7-400-37 (polyester, 37 micron opening, 28% open area). The exact limits relating to the dimension of the openings and the percent open area can be determined empirically in a relatively easy manner, and will depend, at least in part, on the particle size of the particular beverage ingredient being used.

Also shown in FIG. 1 is a power supply 68, which may conveniently be arranged as shown in any available space within the cabinet 69 enclosing the coffee brewer. This power supply may be of conventional form adapted to supply 120 volt AC power for operation of heating element 21 and 24 volt AC power for operation of the solenoid valves and drive motors hereinafter referred to. The manner of connection of this power supply to the various components of the coffee brewer above-described will be discussed further hereinafter.

The entire coffee brewer assembly shown in FIG. 1 is desirably enclosed within a cabinet 69 which may be molded of thermoplastic or fabricated of any other suitable material and desirably may have its front panel hinged to permit access to the coffee brewing apparatus for maintenance purposes and may be provided with an opening, as shown, in its lower left front corner for the insertion of cups or other receptacles for receiving brewed coffee. Also mounted in the door may be an adjustable timer 70 for controlling the operation of the coffee brewer in the manner discussed hereinafter, and a starting switch 71 for initiating the coffee brewing cycle, an indicator light 72 for indicating that the water in tank 10 has reached a temperature suitable for brewing coffee, and a second indicator light 73 for indicating that the brewing process is in progress. The electrical connections of these items will be described further hereinafter.

Reference is now made to FIG. 2 which is a schematic diagram showing the electrical wiring of various of the components of the coffee brewer shown in FIG. 1 and certain additional components, in which the same reference numerals are used to designate components corresponding to those shown in FIG. 1. A conventional plug 80 is provided for connection to a receptacle for providing power therefrom at the customary 120 volts AC. Power is supplied through a normally-open two-pole switch 81, 81' for connecting and disconnecting power to the coffee brewer. Both sides of the output lines from switch 81 preferably are separately fused by fuses 82 and 83. Across the line following these fuses are serially connected the contacts of a normally open relay 86 and the water heating element 21 as shown in FIG. 1. Also connected across the line is the primary winding of a transformer 83, the output connections from the secondary of which are preferably separately fused by fuses 84 and 85. Transformer 83 is designed and constructed to reduce the 120 volt line voltage to 24 volts AC for operation of various elements of the coffee brewer mentioned hereinafter. Across the 24-volt output lines 88 and 92 is connected a thermostat element 22 having normally closed contacts in series with winding 87 of relay 86. Thus, when switch 81 is closed to supply power to the system, relay 86 will be actuated to close its contacts and supply power at 120 volts AC through heating element 21 to cause it to be actuated to heat water in tank 10 of FIG. 1. Thermostat 22, which is shown in FIG. 1 is positioned to sense the temperature of water within tank 10, preferably may be set to cause its contacts to open at a temperature of approximately 205° F., which is the preferred temperature of water to be used in brewing coffee. This will cause the contacts of relay 86 to reopen and interrupt the supply of power to heating element 21 until the temperature of water in tank 10 again falls appreciably below 205° F. Also connected in series across the 24-volt AC supply lines are level control switch 19, as shown in FIG. 1, and winding 18 of water supply valve 16 as also shown in FIG. 1. The contacts of level control switch 19 are normally closed so as to actuate winding 18 and open water supply valve 16 whenever power is supplied to the system so as to cause water to flow into tank 10. When the desired level of water in tank 10 is reached, the contacts of level control switch 19 will open, deenergizing winding 18 and causing water supply valve 16 to close until the level of water in tank 10 falls appreciably below the desired level. It is noted that although power will be supplied to water heating element 21 immediately upon closing of switch 81 and before there is any water in tank 10, the delay in heating up of element 21 will normally be such that it will not reach a temperature sufficiently high to cause it to burn out before an adequate amount of water is introduced into tank 10 through water supply valve 16.

24-volt AC supply line 88 normally is connected through the switch portion 89 of a time-delay relay 94, a normally-open momentary contact switch 71 and time-delay relay 94 to the opposite 24-volt supply line 92. Winding 95 of time-delay relay 94 is arranged to actuate switch portion 89. A normally-open thermostat 90 is connected in series with an indicator light 72 from the output side of relay switch 89 to the opposite 24-volt supply line 92. Like thermostat 22, thermostat 90 may be arranged to sense the temperature of water in tank 10 of FIG. 1 and preferably is adjusted to close its contacts when a temperature of 195° F. or greater is reached to cause indicator light 72 to light, thereby indicating that the water in tank 10 has reached a temperature sufficiently high for use in brewing coffee. Line 96 is provided from the normally disconnected terminal 97 of relay switch 89. A second indicator light 73 is connected between line 96 and the lower 24-volt supply line 92. Time-delay relay 94 is provided with a suitable control means 70 for causing it to remain actuated for a controllable period of time following its actuation when momentary contact switch 71 is closed. Control means 70 may be calibrated in terms of the number of cups of coffee to be produced. Also connected from 24-volt supply line 96 to the opposite 24-volt supply line 92 are the filter belt drive motor 63 as shown in FIG. 1, the actuating solenoid 98 of the water supply valve 30 as shown in FIG. 1, and the ground coffee impeller drive motor 54 as shown in FIG. 1. A suitable means 99 for adjusting the speed of motor 54 may be included in series therewith between the 24-volt supply lines 96 and 92, which may take the form of a conventional SCR speed control for adjusting the speed of motor 54 so as to insure the delivery of ground coffee to the funnel portion 25 of mixing duct 24 in FIG. 1 at the desired rate.

The operation of electrical circuits of the coffee brewer as just described is as follows: When switch 81 is closed, 120-volt AC power will be supplied to the primary winding of transformer 83 to product 24-volt AC power between lines 88 and 92 connected to the secondary winding of transformer 83, winding 87 of relay 86 will be energized through thermostat 22 to actuate relay 86 and supply power at 120 volts AC to heater element 21. Power will continue to be supplied to element 21 until the water in tank 10 has reached a temperature of 205° F. as determined by thermostat 22, at which time the contacts of thermostat 22 will open and actuate relay 86 to discontinue the supply of power to element 21. Also, when switch 81 is closed, solenoid 18 of water supply valve 16 will be energized to open it and cause water to be introduced into tank 10 of FIG. 1. Valve 16 will continue in its open position until solenoid 18 is deenergized by the opening of the contacts of level switch 19 when the water in tank 10 reaches the desired level. When the water in tank 10 has been heated to a suitable level (e.g. 190° F.) by the operation of heating element 21, the contacts of thermostat 90 will close and cause indicator light 72 to light, thereby indicating that the water in tank 10 has reached a temperature suitable for brewing coffee. At any time thereafter, momentary contact switch 71 may be actuated to actuate time delay relay 94 that, through coil 95, causes the movable arm of relay 89 to move to contact 97 and remain there for a predetermined period of time as determined by the setting of control means 70. When this occurs, the following also will take place: Indicator light 73 will light to indicate that the brewer is operating to brew coffee, filter drive motor 63 will commence running to drive the filter belt 60 in FIG. 1, solenoid 98 of hot water supply valve 30 will be energized to open valve 30 and permit the supply of hot water from tank 10 to mixing duct 24 of FIG. 1, and coffee injector drive motor 54 will commence running to cause ground coffee from coffee container 50 to be supplied through tube 55 to mixing duct 24. All of these actions will continue for a predetermined period of time as determined by time delay relay 94 sufficient to accomplish the brewing of the desired number of cups of coffee as determined by the setting of control means 70. Upon the expiration of this predetermined period, coil 95 will be deenergized to cause the arm of relay 89 to return to its initial position and remove the supply of power to indicator light 73, motors 63 and 54 and solenoid 98 of hot water supply valve 30. Indicator light 73 will be turned off, motors 63 and 54 will stop running, and hot water supply valve 30 will be closed to discontinue the supply of hot water to mixing duct 24. At this point the brewer is again ready for operation to produce a new batch of coffee.

The over-all operation of the coffee brewer in accordance with the invention will now be described with reference to both FIGS. 1 and 2. As hereinbefore explained with reference to FIG. 2, water from any suitable source is supplied to tank 10 under control of water inlet valve 16 and level control switch 19, and the water in the tank is raised to and maintained at a suitable temperature for brewing coffee by heating element 21 controlled by thermostat 22 through relay 86. When the coffee-brewing cycle is initiated by closing momentary contact switch 71, heated water and ground coffee are simultaneously introduced into the funnel portion 25 of mixing duct 24 at predetermined rates and for a predetermined period of time as controlled by control means 70 associated with time-delay relay 94 depending upon the amount of liquid coffee to be produced. The rate of introduction of heated water and ground coffee will obviously be dependent upon the time required for the resultant mixture of water and ground coffee to pass through mixing duct 24 and on the relative amounts of ground coffee and water required to produce a satisfactory brew of liquid coffee. The rate of introduction of ground coffee is determined by the speed of rotation of helical impeller 53 which is driven by motor 54 to force the ground coffee from container 50 through tubes 55 and 56 into funnel portion 25 of mixing duct 24. The rate of introduction of heated water similarly may be controlled by the design and adjustment of inlet valve 30. As previously mentioned, the lower end of tube 31 for supplying heated water into funnel portion 25 is so arranged as to direct the water tangentially with respect to funnel portion 25 so as to achieve an agitating and washing action in funnel portion 25 such as to insure thorough mixing of the heated water and ground coffee. The mixture of heated water and ground coffee passes downward from funnel portion 25 through tubular portion 27 of mixing duct 24, and as previously mentioned the latter may include a helical or other form of insert 28 adapted to increase the time required for the mixture of heated water and coffee to pass from the top to the bottom of tubular portion 27 such as to insure adequate brewing action to occur in tubular portion 27 before the mixture leaves mixing duct 24 at the lower end of tubular portion 27. Because the tubular portion 27 is surrounded by heated water contained within tank 10 the mixture of water and ground coffee within tubular portion 27 is maintained at a suitably high temperature during passage through mixing duct 24 to insure proper brewing action. The mixture of heated water and ground coffee ultimately emerges from the lower end of tubular portion 27 and impinges upon the surface of filter belt 60 which operates in the usual manner to remove the spent coffee grounds and permit filtered brewed coffee to pass through it and be collected in the tray portion 65 of assembly 64 for delivery through spout 66 to a cup 67 or other receptacle for receiving brewed coffee. Since filter belt 60 is in continuous motion past the lower end of mixing duct 24 the spent coffee grounds are continually removed from the region near the lower end of mixing duct 24 so as to continually expose a fresh filter surface and then are dumped into the overflow pan 38 as the filter belt passes over roller 62. While I have found that this mode of removal of the spent coffee grounds from filter belt 60 is normally adequate to maintain a sufficiently clean surface thereof for effective filtering action, it may be desirable from time to time to remove and clean the filter belt 60 by rinsing it.

In the preferred embodiment of the invention herein described, the tubular portion 27 of mixing duct 24 is arranged within tank 10 so as to be surrounded by heated water so as to maintain the temperature of the coffee-water mixture therein at a suitably high temperature during the brewing process, which affords a very convenient way of achieving this result. However, it will be apparent that said tubular portion 27 could also be disposed outside tank 10, and could then be provided with suitable means, such as a resistive heating element wound around it, for maintaining the temperature of the mixture within it.

I have found that a continuous coffee brewer of the sort herein described is capable of producing brewed coffee very rapidly in any desired quantities and of quality and flavor superior to that produced by prior coffee brewers, particularly those relying on the batch principle of brewing.

Reference throughout this application, including the claims, to the solid beverage ingredient being "particulate" is no intended to limit this invention to a particular particle size range, and, in fact, is intended to encompass very fine ground beverage ingredients that might normally be called "powders". The beverage ingredients used in this invention preferably are particulate to provide a large surface area for exposure to the liquid employed to extract components from the ingredients, and also to permit the beverage ingredients to pass through the tubular brewing zone of the preferred mixing duct construction of this invention.

While the invention has been described with particular reference to a preferred embodiment thereof, it will be understood that it is susceptible of various modifications such as will occur to those skilled in the art in light of the foregoing disclosure and within the scope of the following claims.

What is claimed is:

1. A continuous brewer for producing a beverage suitable for human consumption, said brewer comprising:
    (a) a mixing duct for mixing a liquid and a particulate beverage ingredient and for brewing the beverage, said duct including an inlet adjacent one end for receiving the liquid and the beverage ingredient to mix them together, an outlet for delivering the brewed beverage and spent beverage ingredient and an elongate brewing zone intermediate the inlet and outlet through which the mixed liquid and beverage ingredient continuously move;
    (b) means for delivering the liquid and particulate beverage ingredient to the inlet of the mixing duct;
    (c) a movable filter intercepting the flow of brewed liquid and spent beverage ingredient from the outlet of the mixing duct for collecting the spent material and passing the brewed beverage;
    (d) filter mounting means for permitting movement of the filter with respect to the outlet of the mixing duct at the same time that the brewed beverage and spent material are being delivered through the outlet;
    (e) drive means for moving the filter relative to the outlet of the mixing duct;
    (f) control means for actuating the drive means at the same time that the brewed beverage and spent beverage ingredient are being delivered through the mixing duct outlet to move the filter with respect to the oulet and thereby remove spent beverage ingredient and present a fresh filter surface for receiving the brewed beverage; and
    (g) means for receiving and dispensing the brewed and filtered beverage after passage through the filter.

2. The continuous brewer of claim 1 for use in making a heated beverage, such as coffee, including means for maintaining the mixture of liquid and particulate beverage ingredient within the mixing duct at a desired temperature for brewing the beverage.

3. The continuous brewer of claim 2 including a liquid reservoir for heating and storing the liquid employed to make the hot beverage, at least a portion of said mixing duct traversing said liquid reservoir so as to be surrounded by heated liquid in said reservoir for maintaining the temperature of the mixture of the liquid and particulate beverage ingredient within said duct at a desired brewing temperature.

4. The continuous brewer of claim 1 in which the inlet of the mixing duct comprises a funnel-like portion for initially receiving the liquid and particulate beverage ingredient, said elongate brewing zone including an elongated tubular portion attached to said funnel portion at the smaller end thereof.

5. The continuous brewer of claim 4 including an insert in the tubular portion of the mixing duct for effectively increasing the time of transit of the mixture of liquid and beverage ingredient through said tubular portion to thereby increase brewing time.

6. The continuous brewer of claim 1 including a reservoir for storing the particulate beverage ingredient prior to said ingredient being directed to the inlet of the mixing duct, and in which the beverage ingredient delivering means includes a conveyor tube for conveying the particulate ingredient from the reservoir to the inlet of the mixing duct and impeller means actuatable to force the particulate beverage ingredient through said conveyor tube.

7. The continuous brewer of claim 1 in which the filter comprises a continuous belt of filter material and said filter mounting means includes rollers adapted to be driven so that the surface of said belt moves past the outlet of the mixing duct, the drive means for the filter being continuously actuated by its control means as liquid and particulate beverage ingredient are delivered to the inlet of the mixing duct.

8. The continuous brewer of claim 7 including selectively controllable timing means arranged to control the liquid and beverage ingredient delivering means to cause them to supply the liquid and beverage ingredient to the inlet of the mixing duct during pre-selectable intervals and for actuating the filter belt drive means to drive said filter belt during the same preselectable intervals that the liquid and beverage ingredient are directed to the inlet of the mixing duct.

9. The continuous brewer of claim 1 in which the beverage ingredient delivering means includes a speed control system for permitting variation of the rate of delivery of the particulate beverage ingredient to the inlet of the mixing duct.

10. The continuous brewer of claim 1 including control means arranged to control the liquid and particulate beverage ingredient delivering means to cause them to supply liquid and beverage ingredient to the inlet of the mixing duct simultaneously with actuating the drive means for moving the filter relative to the outlet of the mixing duct.

11. The continuous brewer of claim 1 for brewing coffee, including a water reservoir for heating and storing heated water and a coffee reservoir for storing ground coffee, the liquid delivering means being effective to deliver water from the water reservoir to the inlet of the mixing duct, and the beverage ingredient delivering means being effective to deliver ground coffee from the coffee reservoir to the inlet of the mixing duct.

* * * * *